(12) United States Patent
Tsai et al.

(10) Patent No.: US 11,929,547 B2
(45) Date of Patent: Mar. 12, 2024

(54) MOBILE DEVICE

(71) Applicant: HTC Corporation, Taoyuan (TW)

(72) Inventors: Tiao-Hsing Tsai, Taoyuan (TW);
Chien-Pin Chiu, Taoyuan (TW);
Hsiao-Wei Wu, Taoyuan (TW);
Li-Yuan Fang, Taoyuan (TW);
Shen-Fu Tzeng, Taoyuan (TW);
Yi-Hsiang Kung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/297,325

(22) Filed: Apr. 7, 2023

(65) Prior Publication Data
US 2023/0246328 A1    Aug. 3, 2023

Related U.S. Application Data

(63) Continuation of application No. 17/038,963, filed on Sep. 30, 2020, now Pat. No. 11,664,583, which is a
(Continued)

(51) Int. Cl.
*H01Q 1/24*     (2006.01)
*H01Q 5/335*    (2015.01)
(Continued)

(52) U.S. Cl.
CPC ............. *H01Q 1/243* (2013.01); *H01Q 5/335* (2015.01); *H01Q 9/04* (2013.01); *H01Q 9/42* (2013.01); *H01Q 21/28* (2013.01); *H04M 1/026* (2013.01)

(58) Field of Classification Search
CPC .......... H01Q 1/243; H01Q 5/335; H01Q 9/04; H01Q 9/42; H01Q 21/28; H01Q 5/307; H01Q 5/328; H01Q 13/10; H04M 1/026
See application file for complete search history.

(56) References Cited

U.S. PATENT DOCUMENTS 10,741,916 B2    8/2020 Li et al.
2015/0123871 A1    5/2015 Chang et al.
(Continued)

FOREIGN PATENT DOCUMENTS

CN    202585714 U    12/2012
CN    104143681 A    11/2014
(Continued)

OTHER PUBLICATIONS

Taiwanese Office Action and Search Report for Taiwanese Application No. 109112297, dated Oct. 30, 2020.
(Continued)

*Primary Examiner* — Hai V Tran
*Assistant Examiner* — Michael M Bouizza
(74) *Attorney, Agent, or Firm* — Birch, Stewart, Kolasch & Birch, LLP

(57) ABSTRACT

A mobile device includes a system circuit board, a metal frame, one or more other antenna elements, a display device, a first feeding element, and an RF (Radio Frequency) module. The system circuit board includes a system ground plane. The metal frame at least includes a first portion and a second portion. The metal frame at least has a first cut point positioned between the first portion and the second portion. The metal frame further has a second cut point for separating the other antenna elements from the first portion. The first cut point is arranged to be close to a middle region of the display device. The first feeding element is directly or indirectly electrically connected to the first portion. A first antenna structure is formed by the first feeding element and the first portion.

44 Claims, 14 Drawing Sheets

Related U.S. Application Data continuation of application No. 15/722,355, filed on Oct. 2, 2017, now Pat. No. 10,879,588.

(60) Provisional application No. 62/439,356, filed on Dec. 27, 2016.

(51) Int. Cl.
  H01Q 9/04 (2006.01)
  H01Q 9/42 (2006.01)
  H01Q 21/28 (2006.01)
  H04M 1/02 (2006.01)

(56) References Cited

U.S. PATENT DOCUMENTS

| | | |
|---|---|---|
| 2016/0164168 A1 | 6/2016 | Choi et al. |
| 2016/0164192 A1 | 6/2016 | Lin |
| 2017/0012341 A1 | 1/2017 | Mai et al. |
| 2017/0048363 A1 | 2/2017 | Lee et al. |
| 2017/0142241 A1* | 5/2017 | Kim .................. H01Q 9/30 |
| 2017/0237151 A1 | 8/2017 | Andujar Linares et al. |
| 2017/0338546 A1 | 11/2017 | Wong et al. |
| 2017/0374182 A1* | 12/2017 | Lee .................. H01Q 1/243 |
| 2018/0062244 A1* | 3/2018 | Huang .................. H01Q 1/243 |

FOREIGN PATENT DOCUMENTS

| | | |
|---|---|---|
| CN | 104143691 A | 11/2014 |
| CN | 104300215 A | 1/2015 |
| CN | 104852122 A | 8/2015 |
| CN | 104993241 A | 10/2015 |
| CN | 105098354 A | 11/2015 |
| CN | 105305028 A | 2/2016 |
| CN | 105490004 A | 4/2016 |
| CN | 105742791 A | 7/2016 |
| CN | 105762515 A | 7/2016 |
| TW | 201242171 A1 | 10/2012 |
| TW | 201448347 A | 12/2014 |
| TW | 201530898 A | 8/2015 |
| TW | 201618374 A | 5/2016 |
| TW | 201635642 A | 10/2016 |
| TW | 201644095 A | 12/2016 |
| WO | WO 2016/101871 A1 | 6/2016 |

OTHER PUBLICATIONS

Wong et al., "Small-Size Narrow Open-Slot Antenna for the 2.4/5.2/5.8-GHz WLAN Operation Along the Side Edge of the Metal-Framed Smartphone," Microwave and Optical Technology Letters, vol. 58, No. 4, Apr. 2016, pp. 886-892.

* cited by examiner

MOBILE DEVICE

CROSS REFERENCE TO RELATED APPLICATIONS

This application is a Continuation of copending application Ser. No. 17/038,963, filed on Sep. 30, 2020, which is a Continuation of copending application Ser. No. 15/722,355, filed on Oct. 2, 2017, which claims the benefit of U.S. Provisional Application No. 62/439,356, filed on Dec. 27, 2016, the entirety of which is incorporated by reference herein.

BACKGROUND OF THE INVENTION

Field of the Invention

The disclosure generally relates to a mobile device, and more particularly, to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, 2500 MHz, 3500 MHz and CBRS (Citizens Broadband Radio Service). Some devices cover a small wireless communication area; these include mobile phones using Wi-Fi and Bluetooth systems and using frequency bands of 2.4 GHz, 5.2 GHz, and 5.8 GHz.

In order to improve their appearance, current designers often incorporate metal elements into mobile devices. However, the newly added metal elements tend to negatively affect an antenna's ability to support wireless communication in mobile devices, thereby degrading the overall communication quality of the mobile device. As a result, there is a need to propose a novel mobile device with a novel antenna structure, so as to overcome the problems of the prior art.

BRIEF SUMMARY OF THE INVENTION

In an exemplary embodiment, the invention is directed to a mobile device that includes a system circuit board, a metal frame, one or more other antenna elements, a display device, a first feeding element, and an RF (Radio Frequency) module. The system circuit board includes a system ground plane. The metal frame at least includes a first portion and a second portion. The metal frame has at least a first cut point positioned between the first portion and the second portion. The metal frame further has a second cut point for separating the other antenna elements from the first portion. The first cut point is arranged to be close to a middle region of the display device. The first feeding element is directly or indirectly electrically connected to the first portion. A first antenna structure is formed by the first feeding element and the first portion. The RF module is electrically coupled to the first feeding element, so as to excite the first antenna structure. The first portion and the second portion of the metal frame are disposed at the same side of the mobile device. The first portion has a first end and a second end. The first end of the first portion is a first shorting point which is electrically coupled to the system ground plane. The second end of the first portion is adjacent to the first cut point.

In another exemplary embodiment, the invention is directed to a mobile device that includes a system circuit board, a metal frame, and one or more other antenna elements. The system circuit board includes a system ground plane. The metal frame at least includes a first portion and a second portion. The metal frame has at least a first cut point positioned between the first portion and the second portion. The other antenna elements are formed by other portions of the metal frame. The metal frame further has a second cut point for separating the other antenna elements from the first portion. The other portions of the metal frame have a third cut point and a fourth cut point. A USB (Universal Serial Bus) hole is positioned between the third cut point and the fourth cut point. The first portion and the second portion of the metal frame are disposed at the same side of the mobile device. The other portions of the metal frame are selectively distributed over a top, a bottom, and/or another side of the mobile device, such that the metal frame substantially has a loop shape.

In another exemplary embodiment, the invention is directed to a mobile device that includes a system circuit board, a metal frame, and one or more other antenna elements. The system circuit board includes a system ground plane. The metal frame at least includes a first portion and a second portion. The metal frame has at least a first cut point positioned between the first portion and the second portion. The other antenna elements are formed by other portions of the metal frame. The metal frame further has a second cut point for separating the other antenna elements from the first portion. The first portion and the second portion of the metal frame are disposed at the same side of the mobile device. The metal frame has a top, a bottom, and another side, such that the metal frame has a loop shape. The metal frame further has a second cut point, a third cut point, and a fourth cut point. The second cut point is positioned between the first portion and the other portions of the metal frame. The third cut point and the fourth cut point are positioned at the other antenna elements. The first portion has a first end and a second end. The first end of the first portion is a first shorting point which is electrically coupled to the system ground plane. The second end of the first portion is adjacent to the first cut point.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
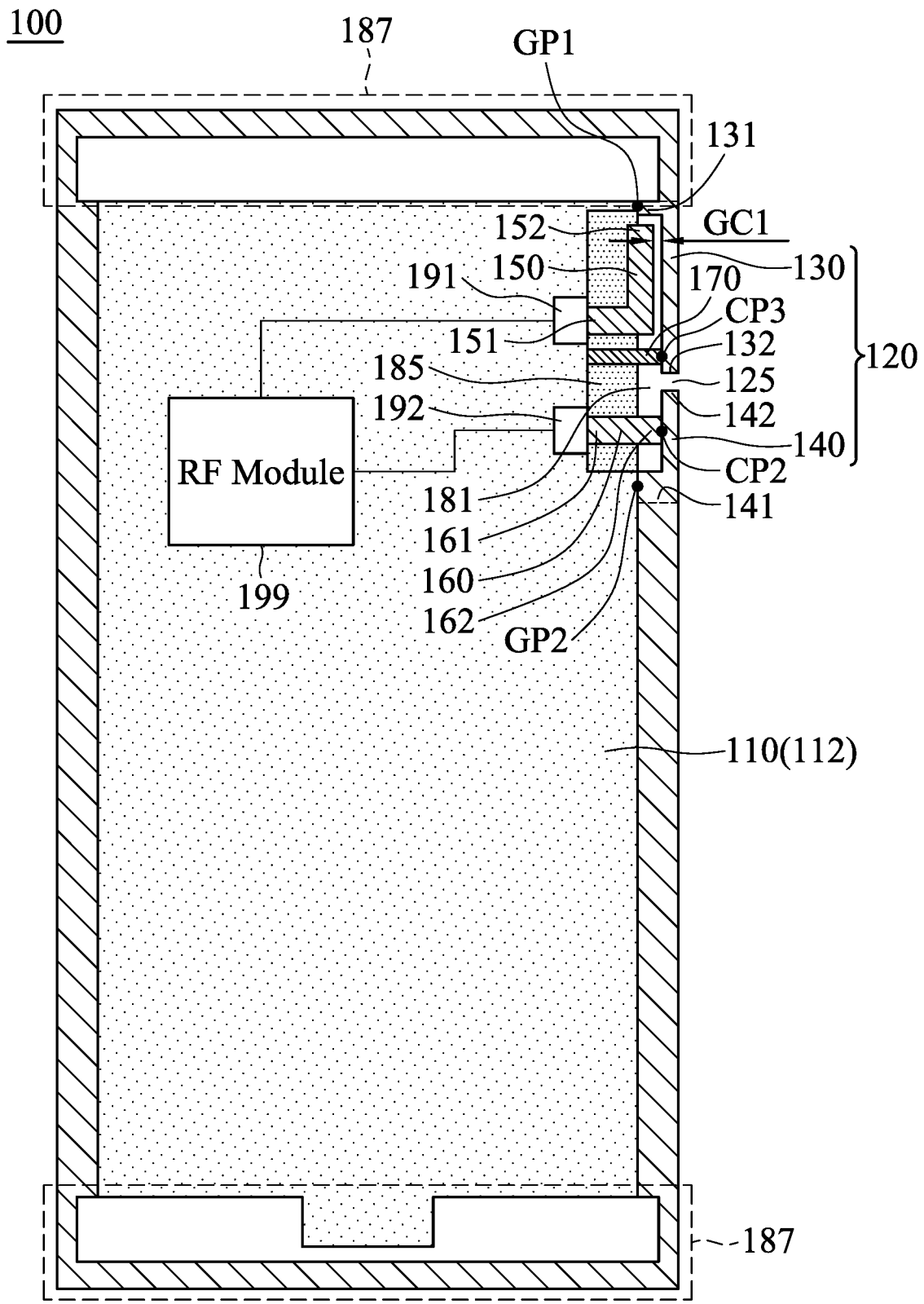
FIG. 1A is a back view of a mobile device according to an embodiment of the invention.
Figure 1B:
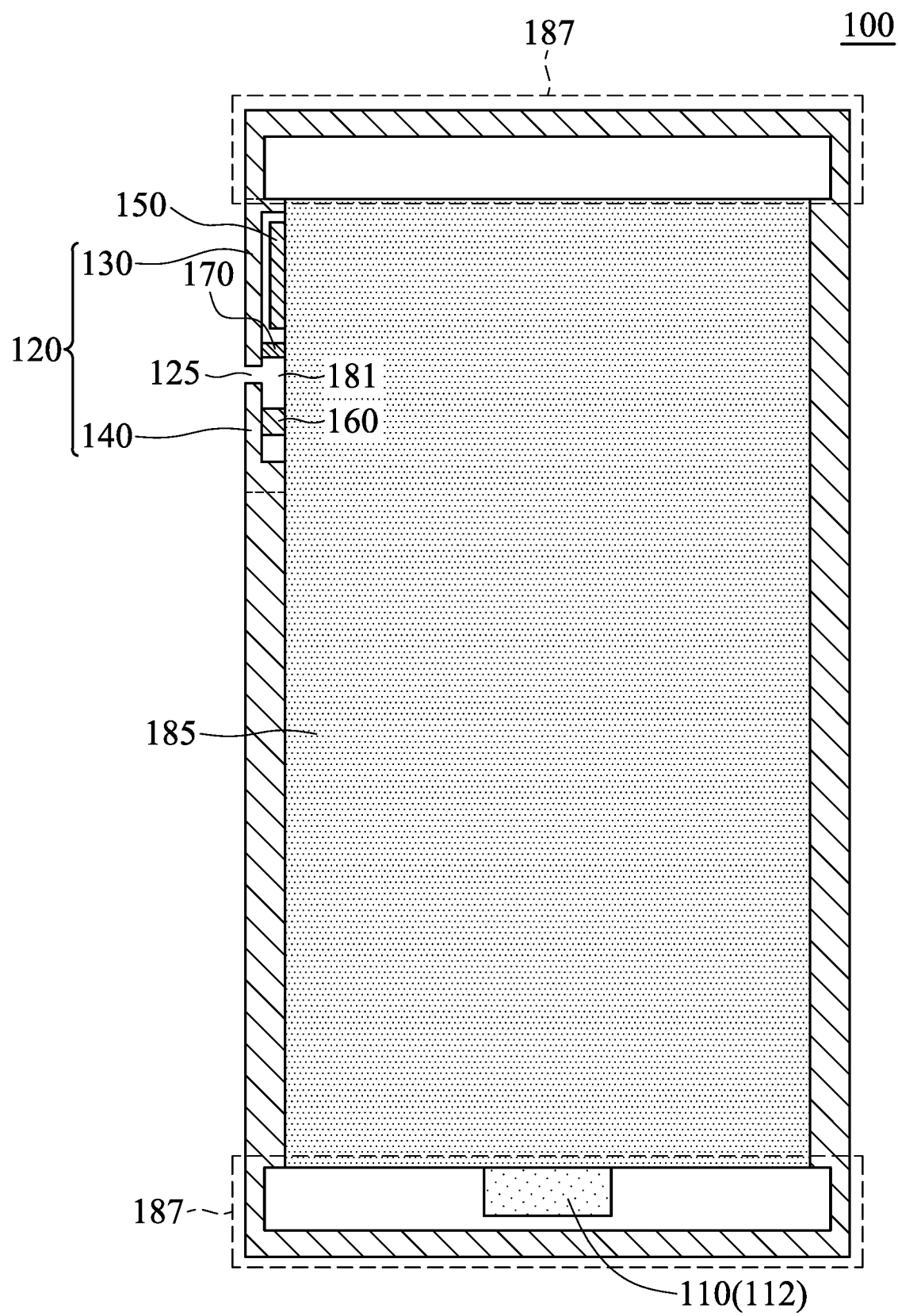
FIG. 1B is a front view of a mobile device according to an embodiment of the invention.

FIG. 1A is a back view of a mobile device 100 according to an embodiment of the invention. FIG. 1B is a front view of the mobile device 100 according to an embodiment of the invention. Please refer to FIG. 1A and FIG. 1B together. The mobile device 100 may be a smart phone, a tablet computer, or a notebook computer. In the embodiment of FIG. 1A and FIG. 1B, the mobile device 100 at least includes a system circuit board 110, a metal frame 120, a first feeding element 150, a second feeding element 160, and an RF (Radio Frequency) module 199. It should be understood that the mobile device 100 may further include other components, such as a processor, s speaker, a touch control module, a power supply module, and a housing although they are not displayed in FIG. 1A and FIG. 1B. The housing may be made of a conductive material or a nonconductive material.

The system circuit board 110 includes a system ground plane 112, which is made of a metal material. The system ground plane 112 is configured to provide a ground voltage VSS. The shapes and sizes of the system circuit board 110 and the system ground plane 112 are not limited in the invention, and they are adjustable according to different requirements. The metal frame 120 may be an appearance element of the mobile device 100. The metal frame 120 at least includes a first portion 130 and a second portion 140. The metal frame 120 at least has a first cut point 125. The first cut point 125 is positioned between the first portion 130 and the second portion 140, so as to completely separate the first portion 130 from the second portion 140. The first portion 130 may substantially have a straight-line shape or an L-shape. Specifically, the first portion 130 has a first end 131 and a second end 132. The first end 131 of the first portion 130 is a first shorting point GP1, which is electrically coupled to the system ground plane 112. The second end 132 of the first portion 130 is an open end, which is adjacent to the first cut point 125. The second portion 140 may also substantially have a straight-line shape or an L-shape. Specifically, the second portion 140 has a first end 141 and a second end 142. The first end 141 of the second portion 140 is a second shorting point GP2, which is electrically coupled to the system ground plane 112. The second end 142 of the second portion 140 is another open end, which is adjacent to the first cut point 125. The first portion 130 and the second portion 140 of the metal frame 120 may be disposed at a side of the mobile device 100. The other portions of the metal frame 120 may be selectively distributed over the top, the bottom, and/or another side of the mobile device 100. Accordingly, the whole metal frame 120 may substantially have a loop shape, and the system circuit board 110 may be disposed in a hollow interior of the metal frame 120.

The first feeding element 150 and the second feeding element 160 are made of metal materials. For example, the first feeding element 150 and the second feeding element 160 may be printed on an FPC (Flexible Circuit Board), or may be formed on a plastic supporting element via an LDS (Laser Direct Structuring) technique. The first feeding element 150 and the second feeding element 160 may further include a pogo pin, a metal spring, or a metal screw. The first feeding element 150 is directly or indirectly electrically connected to the first portion 130 of the metal frame 120, such that a first antenna structure is formed by the first feeding element 150 and the first portion 130. The second feeding element 160 is directly or indirectly electrically connected to the second portion 140 of the metal frame 120, such that a second antenna structure is formed by the second feeding element 160 and the second portion 140. The RF module 199 may be disposed on the system circuit board 110. The RF module 199 is electrically coupled to the first feeding element 150 and the second feeding element 160, so as to excite the first antenna structure and the second antenna structure. In some embodiments, the mobile device 100 further includes a first matching circuit 191 and a second matching circuit 192. Each of the first matching circuit 191 and the second matching circuit 192 may include one or more inductors and/or one or more capacitors. The RF module 199 may be electrically coupled through the first matching circuit 191 to the first feeding element 150, so as to fine-tune the impedance matching of the first antenna structure. The RF module 199 may be further electrically coupled through the second matching circuit 192 to the second feeding element 160, so as to fine-tune the impedance matching of the second antenna structure. It should be understood that the first matching circuit 191 and the second matching circuit 192 are both optional elements; in other embodiments, the first matching circuit 191 and the second matching circuit 192 are omitted, such that the RF module 199 is directly electrically connected to the first feeding element 150 and the second feeding element 160.

In the embodiment of FIG. 1A and FIG. 1B, the first feeding element 150 substantially has an L-shape, and the second feeding element 160 substantially has a straight-line shape. Specifically, the first feeding element 150 has a first end 151 and a second end 152. The first end 151 of the first feeding element 150 is electrically coupled to the RF module 199 (or the first matching circuit 191). The second end 152 of the first feeding element 150 is an open end, which extends toward the first shorting point GP1. The first feeding element 150 is completely separate from the first portion 130 of the metal frame 120. A coupling gap GC1 is formed between the first feeding element 150 and the first portion 130. The length or shape of the first feeding element 150 is adjustable according to different design requirements, and it is not necessarily L-shaped. On the other hand, the second feeding element 160 has a first end 161 and a second end 162. The first end 161 of the second feeding element 160 is electrically coupled to the RF module 199 (or the second matching circuit 192). The second end 162 of the second feeding element 160 is directly electrically connected to a second connection point CP2 on the second portion 140 of the metal frame 120. The second connection point CP2 may be positioned between the first end 141 and the second end 142 of the second portion 140, such as a central point between the first end 141 and the second end 142, but it is not limited thereto.

In some embodiments, the mobile device 100 further includes a display device 185. The display device 185 may be disposed on a front surface of the mobile device 100. A surface of the system circuit board 110, where the RF module 199 is disposed, may face a back surface of the mobile device 100. For example, the display device 185 may be a TFT-LCD (Thin Film Transistor Liquid Crystal Display), an AMOLED (Active-Matrix Organic Light-Emitting Diode) display, or a FOLED (Flexible Organic Light-Emitting Diode) display. Each of the aforementioned display devices may be combined with a touch control module. The first portion 130 and the second portion 140 of the metal frame 120 are adjacent to a side of the display device 185. A long and narrow clearance region 181 is formed between the first portion 130, the second portion 140, and the aforementioned side of the display device 185. The first feeding element 150 has a vertical projection which at least partially overlaps the display device 185. The second feeding element 160 also has a vertical projection which at least partially overlaps the display device 185. That is, the first cut point 125 may be arranged to be close to a middle region of the display device 185. In other words, the first antenna structure and the second antenna structure may be integrated with the clearance region 181, and may be disposed at a side of the mobile device 100 (or adjacent to a side of the display device 185).

In some embodiments, the mobile device 100 further includes one or more other antenna elements 187. The other antenna elements 187 may be formed by the other portions of the metal frame 120, and they may be positioned at the top or the bottom of the mobile device 100. The other antenna elements 187 may be used as main antennas of the mobile device 100. On the other hands, because the clearance region 181 is relatively small, the first antenna structure and the second antenna structure may be used as auxiliary antennas of the mobile device 100, so as to increase the antenna diversity gain of the mobile device 100. The first shorting point GP1 can be positioned between the first antenna structure and the other antenna elements 187, so as to enhance the isolation between the other antenna elements 187 and each of the first antenna structure and the second antenna structure.

Figure 2:
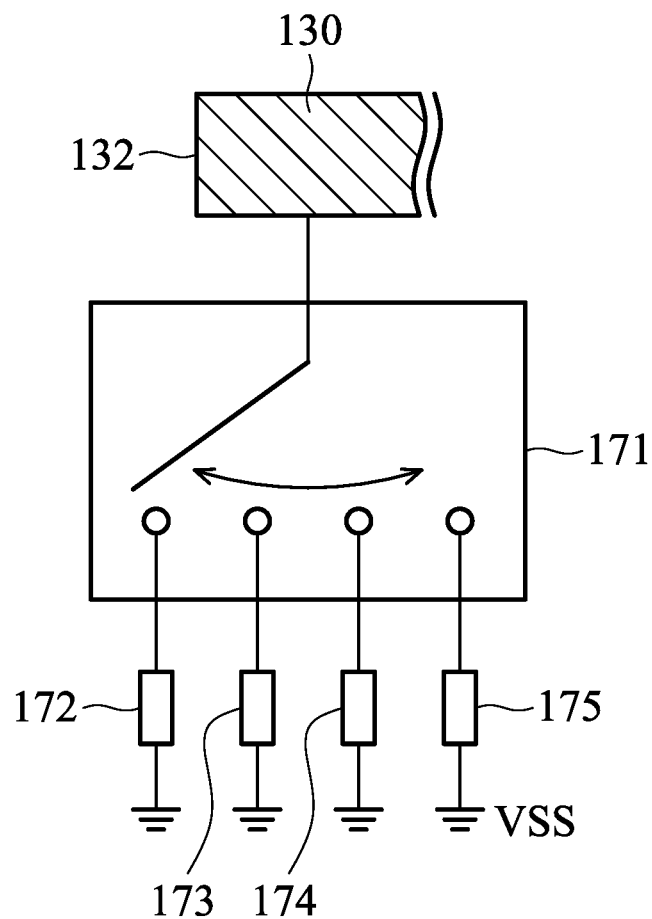
FIG. 2 is a diagram of a tuning element according to an embodiment of the invention.

In some embodiments, the mobile device 100 further includes a tuning element 170, which is electrically coupled between the first portion 130 of the metal frame 120 and the system ground plane 112. FIG. 2 is a diagram of the tuning element 170 according to an embodiment of the invention. In the embodiment of FIG. 2, the tuning element 170 includes a switch element 171 and a plurality of matching elements 172, 173, 174, and 175. For example, the switch element 171 may be an SP4T (Single Pole Four Throw) switch, but it is not limited thereto. Each of the matching elements 172, 173, 174, and 175 may include one or more inductors and/or one or more capacitors, such as chip inductors and/or chip capacitors. The switch element 171 is electrically coupled to the second end 132 of the first portion 130, or is coupled to a third connection point CP3 positioned between the first end 131 and the second end 132 of the first portion 130. The switch element 171 is configured to select one of the matching elements 172, 173, 174, and 175, such that the first portion 130 is electrically coupled through the selected matching element to the ground voltage VSS (or the system ground plane 112). The selection procedure of the switch element 171 may be determined according to a control signal, and the control signal may be generated by a processor according to a user input. Although there are exactly four matching elements 172, 173, 174, and 175 displayed in FIG. 2, in fact, the tuning element 170 may include more or fewer matching elements, so as to meet different requirements. It should be understood that the tuning element 170 is an optional element; in other embodiments, the tuning element 170 is omitted, or is replaced with an open-circuited element or a short-circuited element.

According to the practical measurement, the first antenna structure of the mobile device 100 can cover a median-frequency band from 1710 MHz to 2200 MHz, and a first high-frequency band from 2300 MHz to 2690 MHz, and the second antenna structure of the mobile device 100 can cover a second high-frequency band from 3400 MHz to 3800 MHz. Therefore, the mobile device 100 can support at least the wideband operations of LTE (Long Term Evolution) and CBRS (Citizens Broadband Radio Service).

The antenna theory and the element sizes of the mobile device 100 may be as follows. Practically, the first feeding element 150 and the first portion 130 of the metal frame 120 are excited together to generate the aforementioned median-frequency band. However, the first feeding element 150 is further excited independently to generate the aforementioned first high-frequency band. The second feeding element 160 and the second portion 140 of the metal frame 120 are excited together to generate the aforementioned second high-frequency band. The tuning element 170 is mainly configured to fine-tune the frequency ranges of the median-frequency band and the first high-frequency band. For example, if the inductance of the matching element selected by the switch element 171 becomes smaller, the central frequency of the medial-frequency band and the central frequency of the first high-frequency band will both become higher. Conversely, for example, if the capacitance of the matching element selected by the switch element 171 becomes larger, the central frequency of the medial-frequency band and the central frequency of the first high-frequency band will both become lower. The total length of the first feeding element 150 and the first portion 130 (i.e., the sum of the length from the first end 151 to the second end 152, and the length from the first end 131 to the second end 132) may be substantially equal to 0.5 wavelength ($\lambda/2$) of the median-frequency band. The length of the first feeding element 150 (i.e., the length from the first end 151 to the second end 152) may be substantially equal to 0.25 wavelength ($\lambda/4$) of the first high-frequency band. The length of the second portion 140 (i.e., the length from the first end 141 to the second end 142) may be substantially equal to 0.25 wavelength ($\lambda/4$) of the second high-frequency band. According to the practical measurement, the radiation efficiency of the first antenna structure and the second antenna structure is higher than 20% in the median-frequency band, the first high-frequency band, and the second high-frequency band, and the isolation between the first antenna structure and the second antenna structure is higher than 7 dB. This can meet the requirement of applications of general mobile communication devices.

In the mobile device 100 of the invention, since the metal frame 120 is considered as a portion of the first antenna structure and the second antenna structure, it can effectively prevent the metal frame 120 from negatively affecting the communication quality of the first antenna structure and the second antenna structure. In addition, the first antenna structure and the second antenna structure are both adjacent to the side of the display device 185, and they can be integrated with the small clearance region 181, thereby minimizing the total antenna size (the conventional mobile device and the side of its display device usually have too small a clearance region to accommodate any antenna structure). Furthermore, the first cut point 125 of the metal frame 120 can effectively separate the first antenna structure from the second antenna structure, so as to improve the operation bandwidth and the radiation efficiency of the first antenna structure and the second antenna structure. The invention can support the communication technology including, for example, CA (Carrier Aggregation), MIMO (Multi-Input and Multi-Output), and CBRS (Citizens Broadband Radio Service), and therefore it is suitable for application in a variety of small-size, wideband mobile communication devices.

Figure 3:
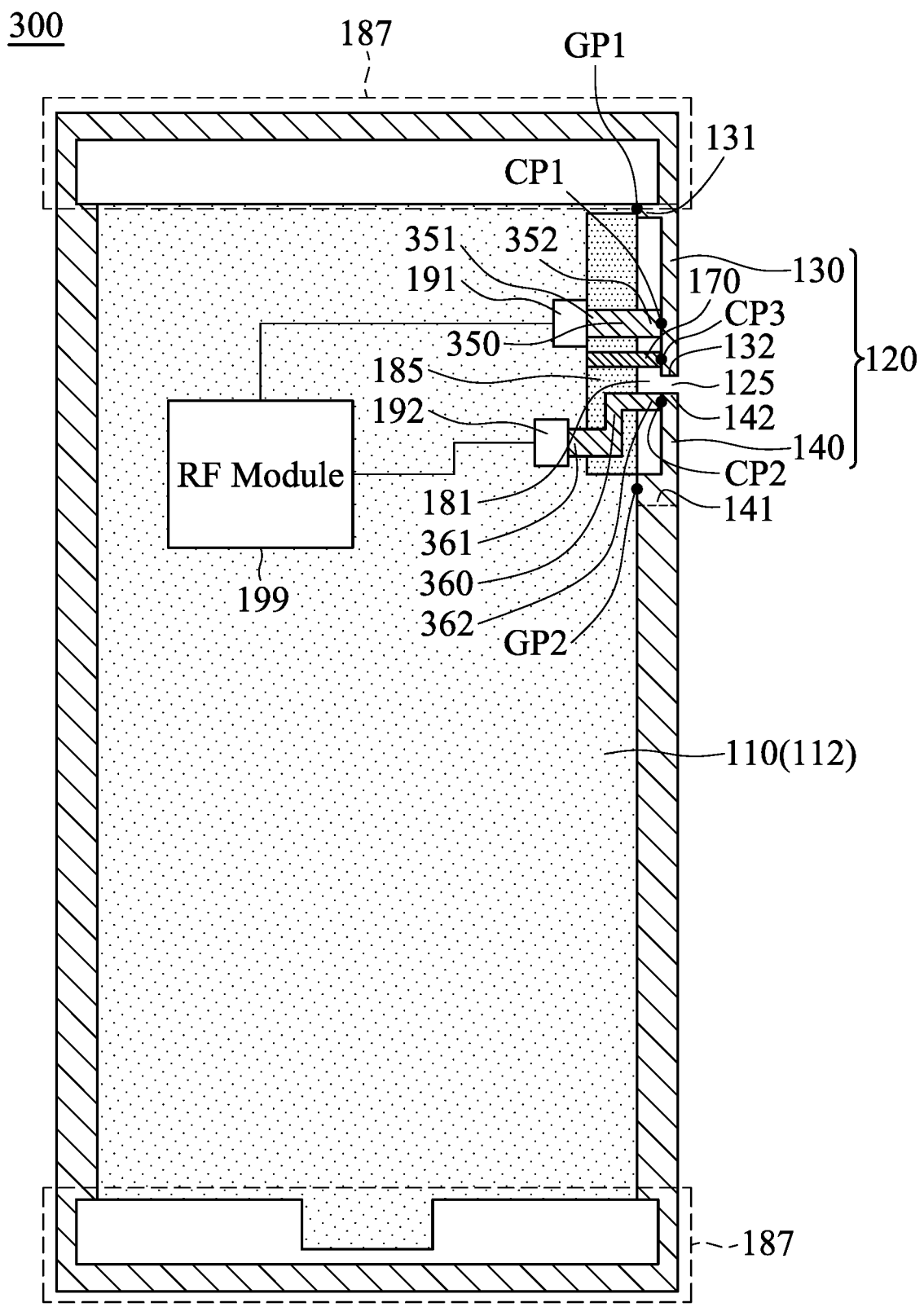
FIG. 3 is a back view of a mobile device according to an embodiment of the invention.

FIG. 3 is a back view of a mobile device 300 according to an embodiment of the invention. FIG. 3 is similar to FIG. 1A. In the mobile device 300 of FIG. 3, a first feeding element 350 is electrically coupled to the first portion 130 of the metal frame 120, such that a first antenna structure is formed by the first feeding element 350 and the first portion 130; a second feeding element 360 is electrically coupled to the second portion 140 of the metal frame 120, such as a second antenna structure is formed by the second feeding element 360 and the second portion 140. In the embodiment of FIG. 3, the first feeding element 350 substantially has a straight-line shape, and the second feeding element 360 substantially has an N-shape. Specifically, the first feeding element 350 has a first end 351 and a second end 352. The first end 351 of the first feeding element 350 is electrically coupled to the RF module 199 (or the first matching circuit 191 which may include only a capacitor). The second end 352 of the first feeding element 350 is directly electrically connected to a first connection point CP on the first portion 130. The first connection point CP1 may be positioned between the first end 131 and the second end 132 of the first portion 130, such as a central point between the first end 131 and the second end 132, but it is not limited thereto. On the other hand, the second feeding element 360 has a first end 361 and a second end 362. The first end 361 of the second feeding element 360 is electrically coupled to the RF module 199 (or the second matching circuit 192). The second end 362 of the second feeding element 360 is directly electrically connected to the second end 142 of the second portion 140. The embodiment of FIG. 3 slightly changes the feeding mechanisms of the first antenna structure and the second antenna structure, but it does not affect the performance of the invention. According to the practical measurement, the first antenna structure of the mobile device 300 can also cover the median-frequency band from 1710 MHz to 2200 MHz, and the first high-frequency band from 2300 MHz to 2690 MHz, and the second antenna structure of the mobile device 300 can also cover the second high-frequency band from 3400 MHz to 3800 MHz. In response to the different feeding mechanisms, the element sizes of the mobile device 300 may be adjusted as follows. The length of the first portion 130 (i.e., the length from the first end 131 to the second end 132) may be substantially equal to 0.25 wavelength ($\lambda/4$) of the median-frequency band. The total length from the first end 351 of the first feeding element 350 through the first connection point CP1 to the second end 132 of the first portion 130 may be substantially equal to 0.25 wavelength ($\lambda/4$) of the first high-frequency band. The total length of the second feeding element 360 and the second portion 140 (i.e., the sum of the length from the first end 361 to the second end 362, and the length from the second end 142 to the first end 141) may be substantially equal to 0.5 wavelength ($\lambda/2$) of the second high-frequency band. Other features of the mobile device 300 of FIG. 3 are similar to those of the mobile device 100 of FIG. 1A and FIG. 1B. Accordingly, the two embodiments can achieve similar levels of performance.

Figure 4:
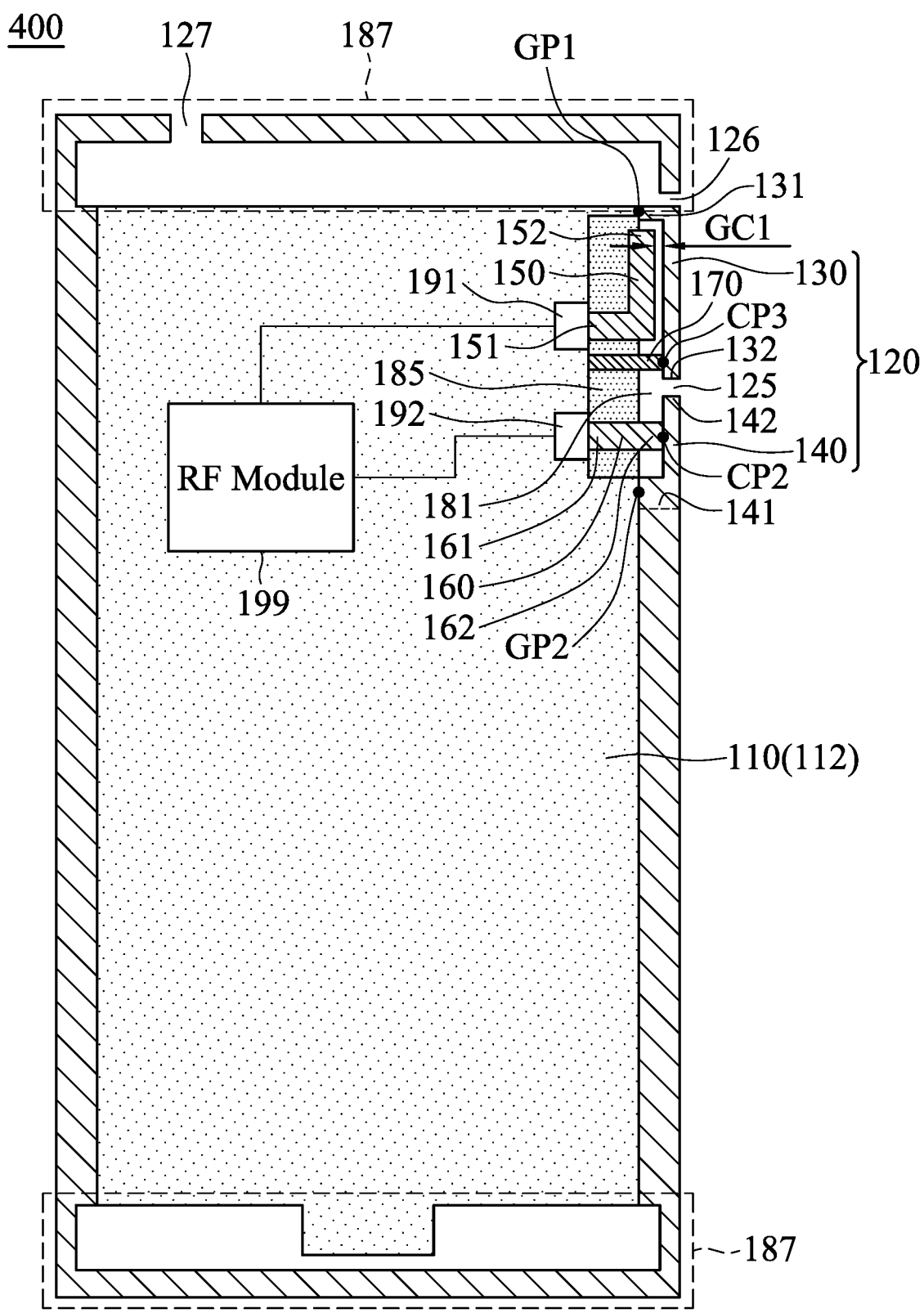
FIG. 4 is a back view of a mobile device according to an embodiment of the invention.

FIG. 4 is a back view of a mobile device 400 according to an embodiment of the invention. FIG. 4 is similar to FIG. 1A. In the mobile device 400 of FIG. 4, the metal frame 120 further has a second cut point 126 and/or a third cut point 127. The second cut point 126 is positioned between the first portion 130 and the other portions of the metal frame 120. The second cut point 126 is adjacent to the first shorting point GP1. The third cut point 127 is positioned at the other antenna elements 187. The second cut point 126 is arranged for completely separating the other antenna elements 187 from the first antenna structure and the second antenna structure, so as to further increase the isolation between the other antenna elements 187 and each of the first antenna structure and the second antenna structure. The third cut point 127 is arranged for adjusting the impedance matching or the resonant frequency of the other antenna elements 187. It should be noted that the number and positions of cut points on the other antenna elements 187 are not limited to the above, and the number of cut points may be increased or decreased according to design requirements. Other features of the mobile device 400 of FIG. 4 are similar to those of the mobile device 100 of FIG. 1A and FIG. 1B. Accordingly, the two embodiments can achieve similar levels of performance.

The following embodiments will introduce a variety of different configurations of the invention. It should be understood that these figures and descriptions are merely exemplary, rather than limitations of the invention.

Figure 5:
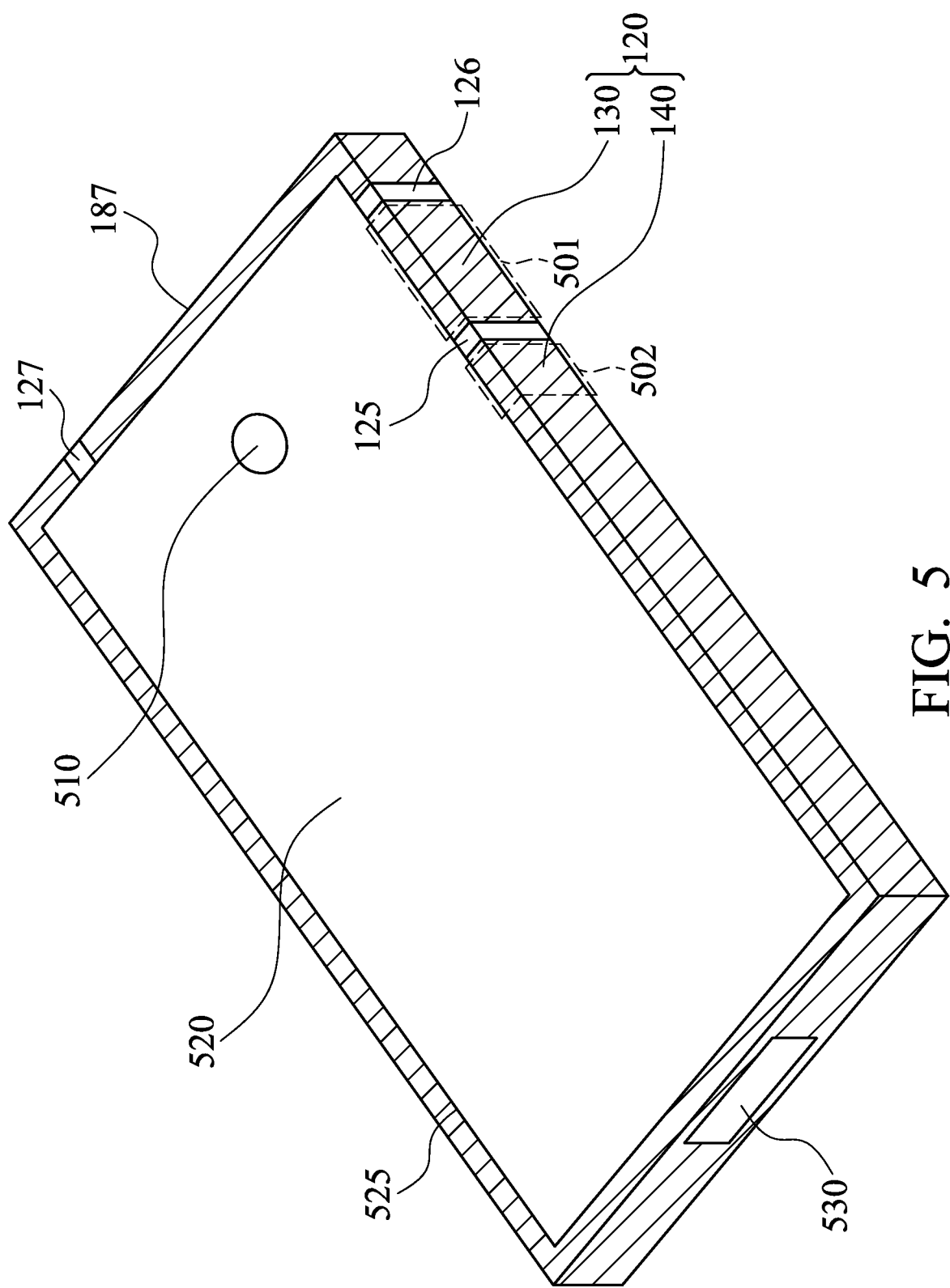
FIG. 5 is a perspective view of a mobile device according to an embodiment of the invention.

FIG. 5 is a perspective view of a mobile device 500 according to an embodiment of the invention. In the embodiment of FIG. 5, the mobile device 500 further includes a main camera 510, a non-metal back cover 520, and a USB (Universal Serial Bus) hole 530. The main camera 510 is embedded in the non-metal back cover 520. As mentioned above, the first antenna structure and the second antenna structure are formed by the first portion 130 and the second portion 140 of the metal frame 120 (the first antenna structure and the second antenna structure may be formed at the first position 501 and the second position 502, respectively). The USB hole 530 may be positioned at the other portions of the metal frame 120, such as the bottom of the mobile device 500. A boundary 525 between the non-metal back cover 520 and the metal frame 120 is positioned at a back side of the mobile device 500 (a display device may be positioned at a front side of the mobile device 500).

Figure 6:
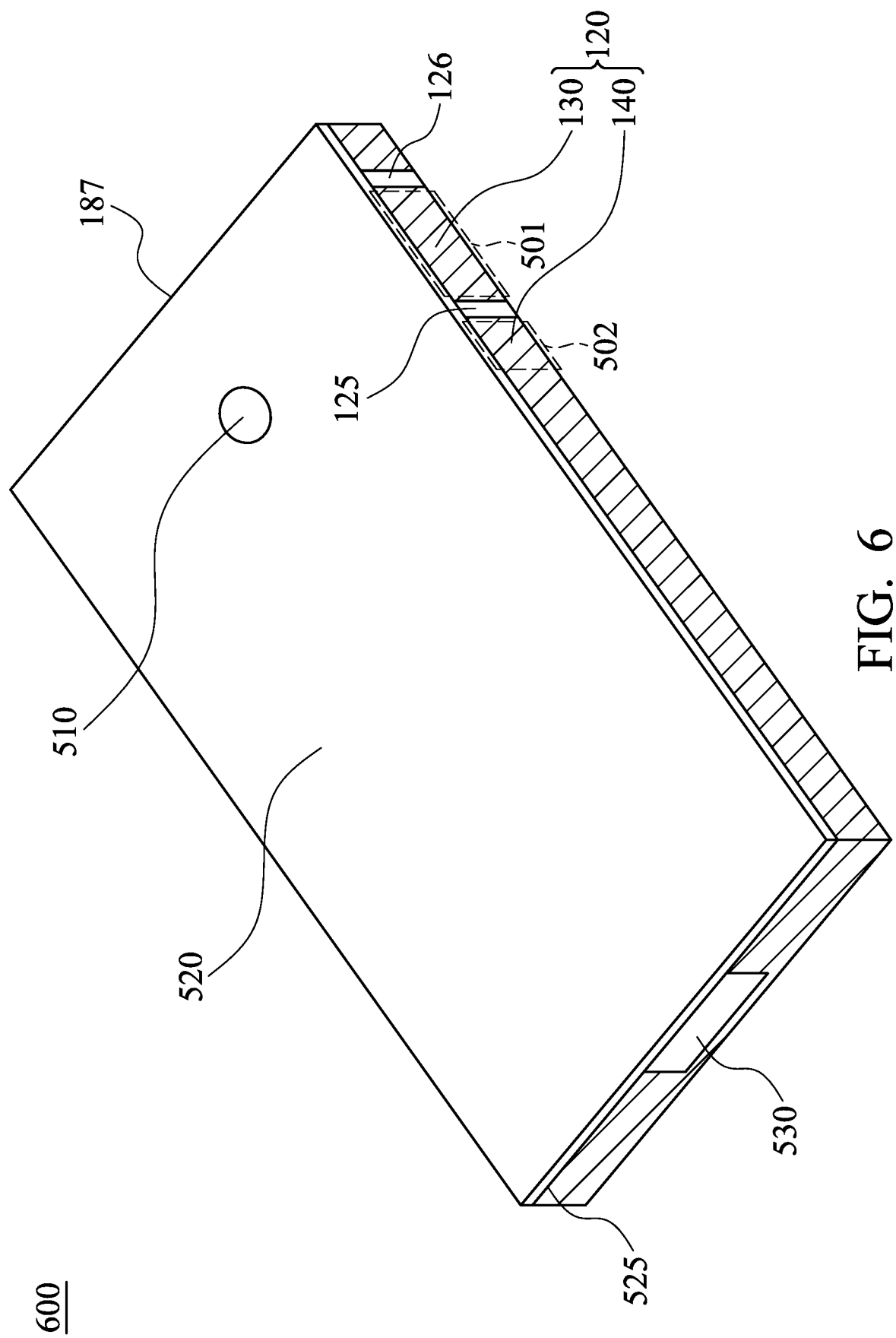
FIG. 6 is a perspective view of a mobile device according to an embodiment of the invention.

FIG. 6 is a perspective view of a mobile device 600 according to an embodiment of the invention. FIG. 6 is similar to FIG. 5. In the embodiment of FIG. 6, the non-metal back cover 520 extends from the back side to a lateral side of the mobile device 600, such that the boundary 525 between the non-metal back cover 520 and the metal frame 120 is positioned at the lateral side of the mobile device 600.

Figure 7:
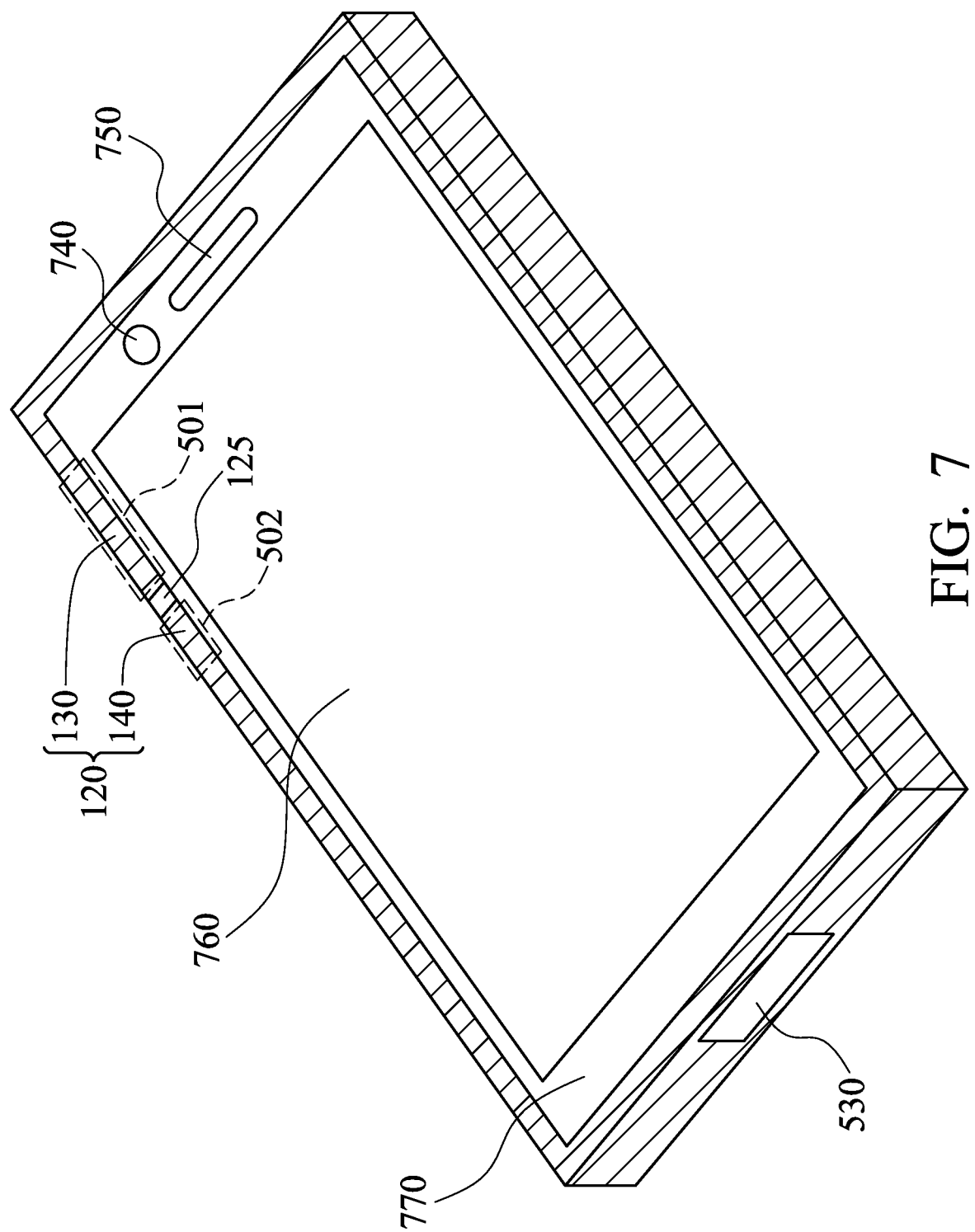
FIG. 7 is a perspective view of a mobile device according to an embodiment of the invention.

FIG. 7 is a perspective view of a mobile device 700 according to an embodiment of the invention. In the embodiment of FIG. 7, the mobile device 700 further includes a front camera hole 740, a front speaker hole 750, a display region 760, and a front glass or plastic material 770. FIG. 7 is used to describe the arrangement relationship of front-side elements of the mobile device 700. As mentioned above, the first antenna structure and the second antenna structure are formed by the first portion 130 and the second portion 140 of the metal frame 120 (the first antenna structure and the second antenna structure may be formed at the first position 501 and the second position 502, respectively). The first cut point 125 of the metal frame 120 is adjacent to the middle of a side of the display region 760. According to the practical measurement, such a design can prevent the display device from interfering with the first antenna structure and the second antenna structure, and further increase the antenna bandwidth.

Figure 8:
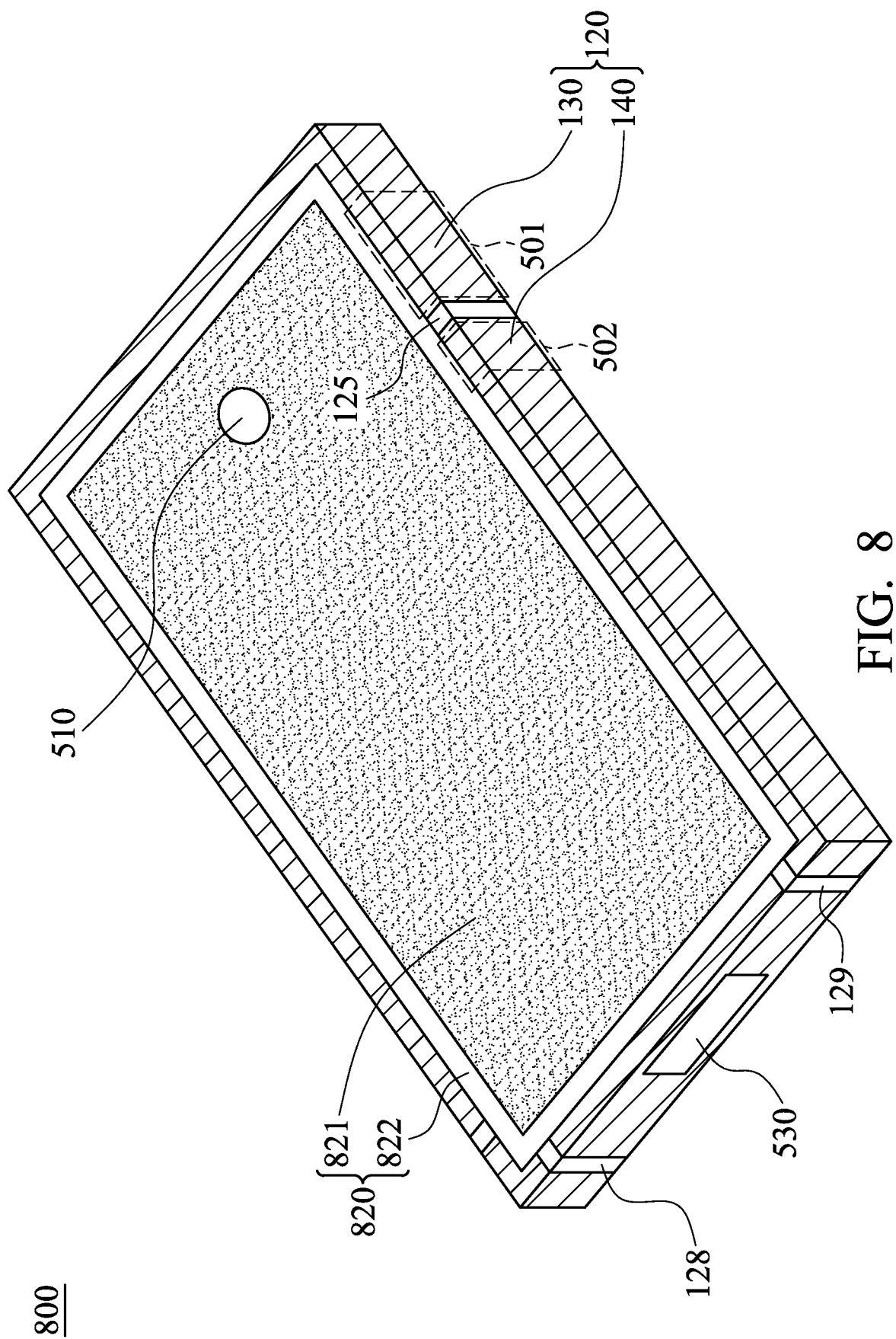
FIG. 8 is a perspective view of a mobile device according to an embodiment of the invention.

FIG. 8 is a perspective view of a mobile device 800 according to an embodiment of the invention. In the embodiment of FIG. 8, the mobile device 800 further includes a back cover 820. As mentioned above, the first antenna structure and the second antenna structure are formed by the first portion 130 and the second portion 140 of the metal frame 120 (the first antenna structure and the second antenna structure may be formed at the first position 501 and the second position 502, respectively). The other portions of the metal frame 120 may further have a fourth cut point 128 and a fifth cut point 129. The USB hole 530 may be positioned between the fourth cut point 128 and the fifth cut point 129. It should be noted that the aforementioned cut points are merely exemplary. In fact, the number and the positions of cut points are adjustable according to different design requirements. The back cover 820 includes a metal portion 821 and a non-metal portion 822. The metal portion 821 substantially has a rectangular shape, and the non-metal portion 822 substantially has a loop shape, such that the metal portion 821 is completely surrounded by the non-metal portion 822. The non-metal portion 822 of the back cover 820 can prevent the metal portion 821 from directly touching the first portion 130 and the second portion 140 of the metal frame 120. Accordingly, good communication quality of the first antenna structure and the second antenna structure can be maintained.

Figure 9:
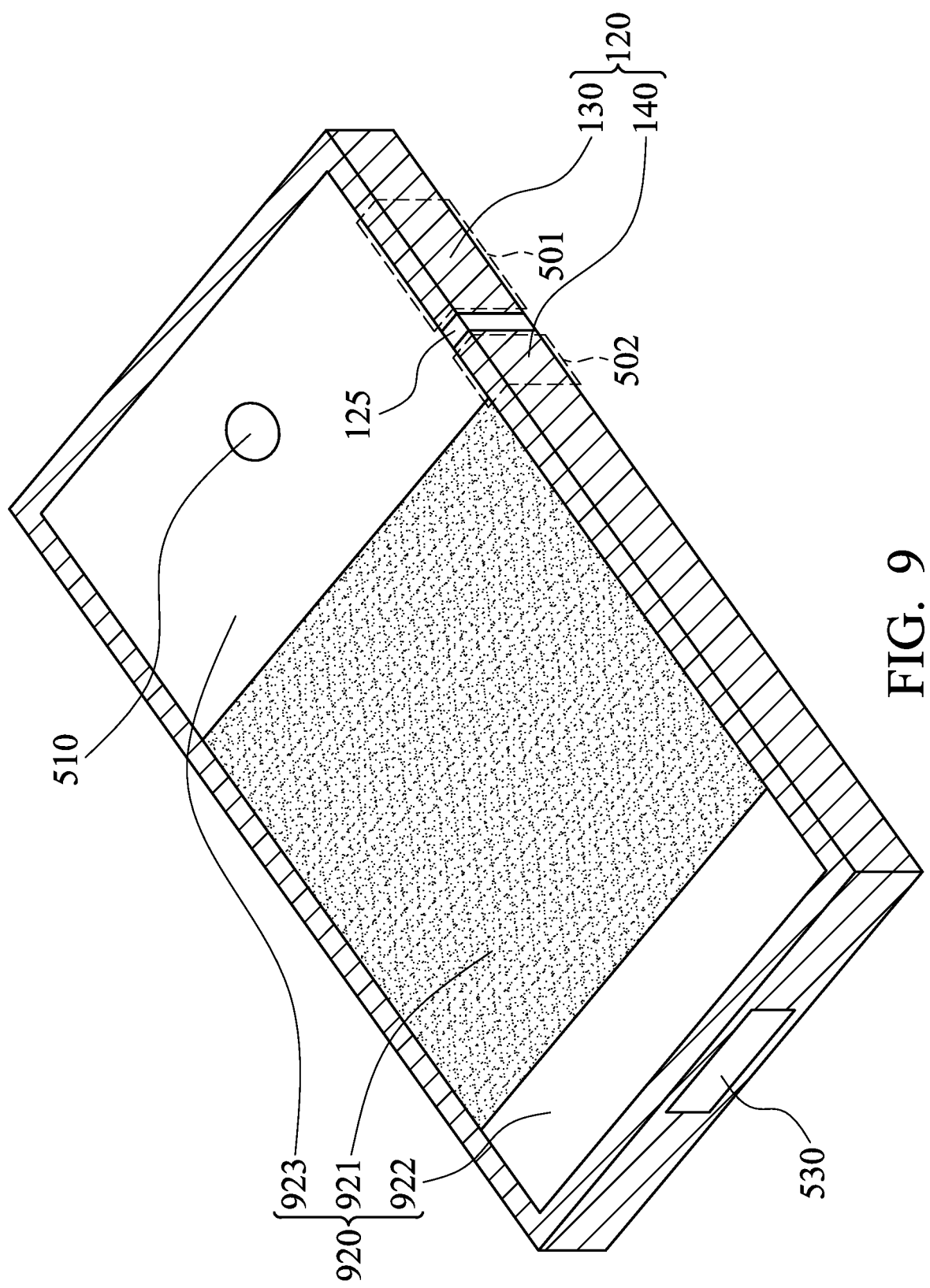
FIG. 9 is a perspective view of a mobile device according to an embodiment of the invention.

FIG. 9 is a perspective view of a mobile device 900 according to an embodiment of the invention. In the embodiment of FIG. 9, the mobile device 900 further includes a back cover 920. As mentioned above, the first antenna structure and the second antenna structure are formed by the first portion 130 and the second portion 140 of the metal frame 120 (the first antenna structure and the second antenna structure may be formed at the first position 501 and the second position 502, respectively). The back cover 920 includes a metal portion 921, a first non-metal portion 922, and a second non-metal portion 923. The metal portion 921 is positioned between the first non-metal portion 922 and the second non-metal portion 923, and is configured to completely separate the first non-metal portion 922 from the second non-metal portion 923. The second non-metal portion 923 of the back cover 920 can prevent the metal portion 921 from directly touching the first portion 130 and the second portion 140 of the metal frame 120. Accordingly, good communication quality of the first antenna structure and the second antenna structure can be maintained.

Figure 10:
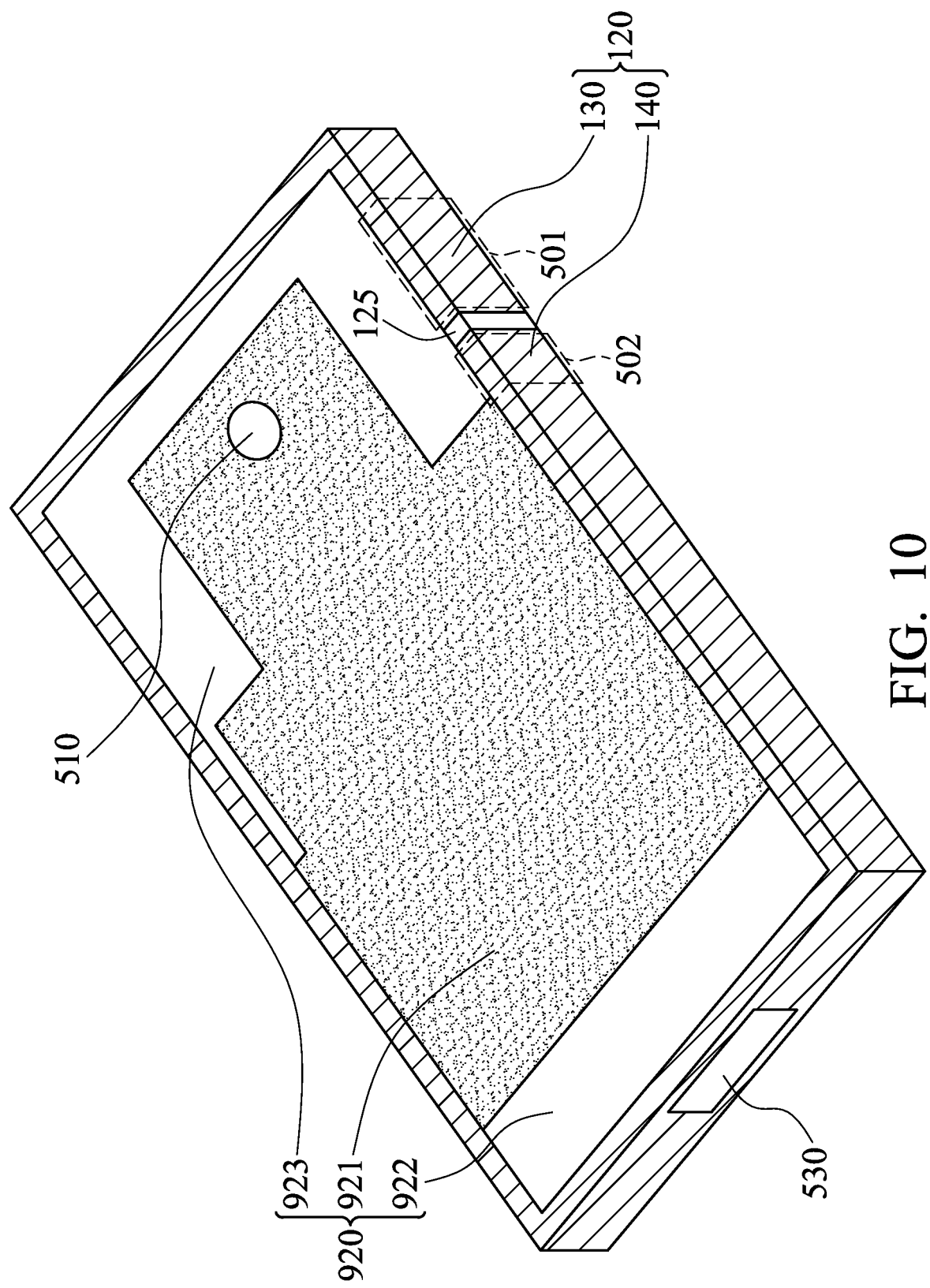
FIG. 10 is a perspective view of a mobile device according to an embodiment of the invention.

FIG. 10 is a perspective view of a mobile device 990 according to an embodiment of the invention. FIG. 10 is similar to FIG. 9. In the embodiment of FIG. 10, the metal portion 921, the first non-metal portion 922, and the second non-metal portion 923 of the back cover 920 have different shapes. For example, the metal portion 921 may substantially have a T-shape, the first non-metal portion 922 may substantially have a straight-line shape, and the second non-metal portion 923 may substantially have a U-shape. In some embodiments, the mobile devices 900 and 990 may use a spray and coat process to reduce the visual difference between the metal portion 921 and each of the first non-metal portion 922 and the second non-metal portion 923, thereby improving the consistency of the appearance of mobile devices 900 and 990.

Figure 11:
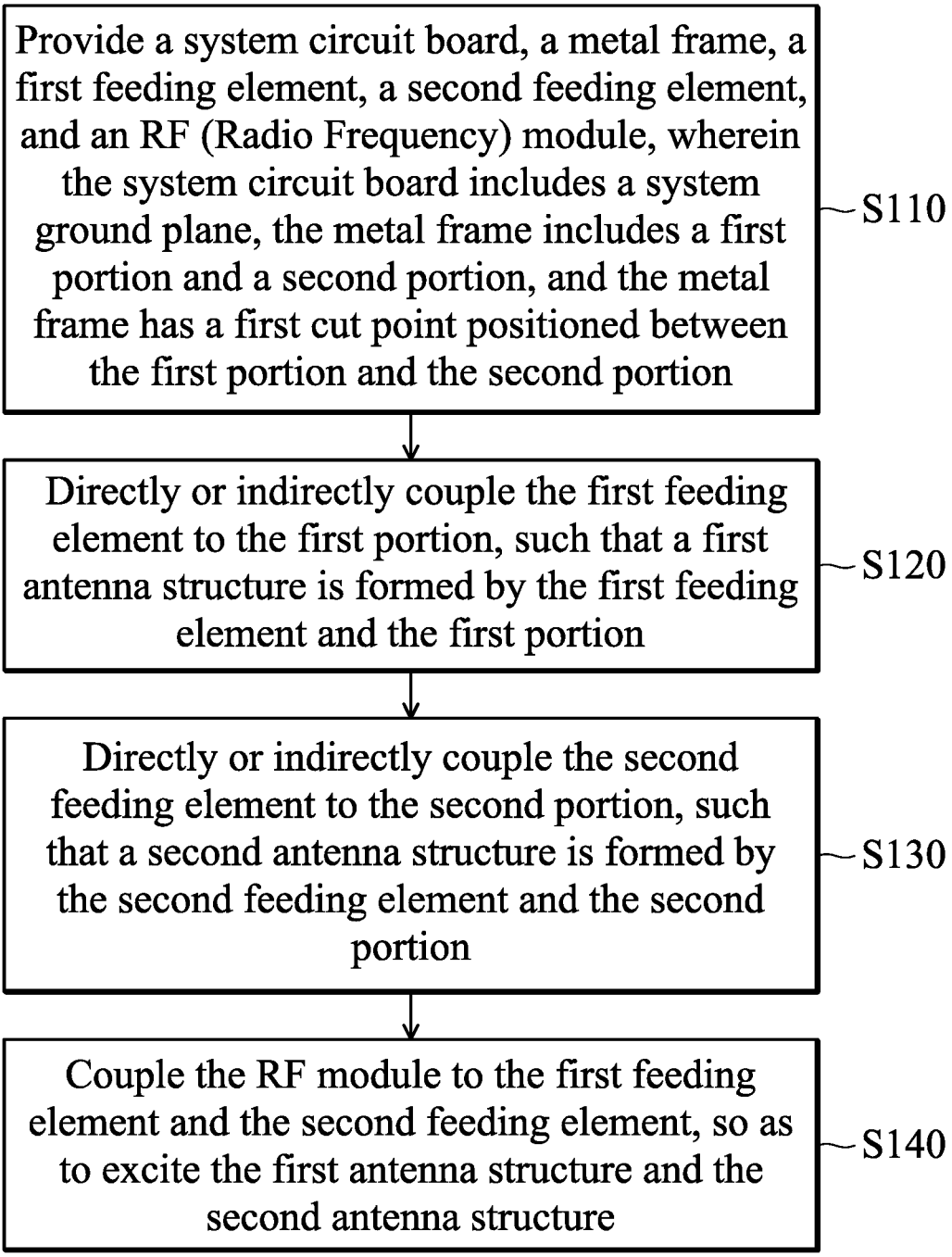
FIG. 11 is a flowchart of a method for manufacturing a mobile device according to an embodiment of the invention.

FIG. 11 is a flowchart of a method for manufacturing a mobile device according to an embodiment of the invention. The manufacturing method includes at least the following steps. In step S110, a system circuit board, a metal frame, a first feeding element, a second feeding element, and an RF (Radio Frequency) module are provided. The system circuit board includes a system ground plane. The metal frame includes a first portion and a second portion. The metal frame has a first cut point positioned between the first portion and the second portion. In step S120, the first feeding element is directly or indirectly electrically connected to the first portion, such that a first antenna structure is formed by the first feeding element and the first portion. In step S130, the second feeding element is directly or indirectly electrically connected to the second portion, such that a second antenna structure is formed by the second feeding element and the second portion. In step S140, the RF module is electrically coupled to the first feeding element and the second feeding element, so as to excite the first antenna structure and the second antenna structure. It should be understood that the above steps are not required to be performed in order, and any one or more device features of FIGS. 1 to 10 may be applied to the manufacturing method of the mobile device of FIG. 11.

Figure 12:
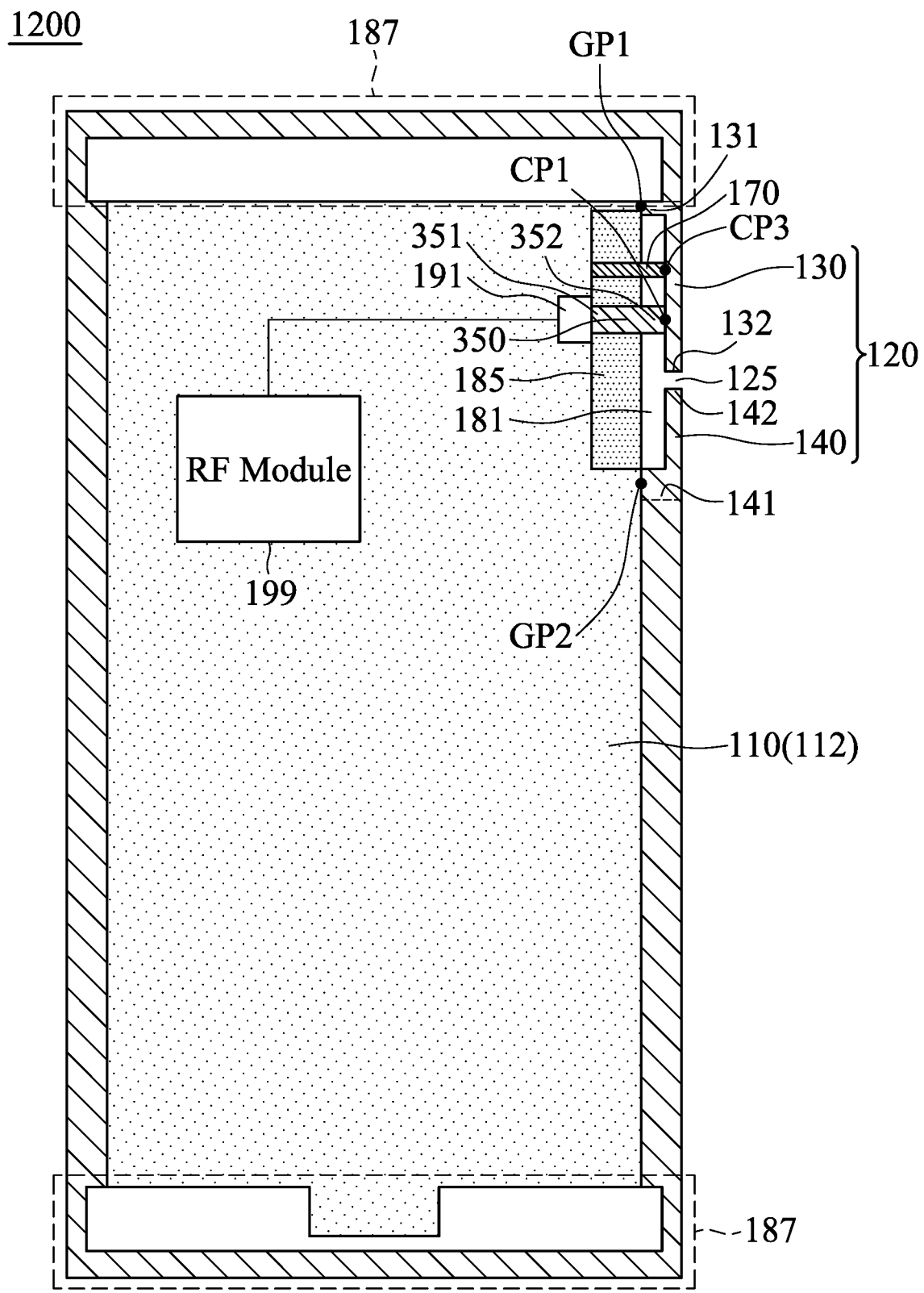
FIG. 12 is a back view of another mobile device according to an embodiment of the invention.

FIG. 12 is a back view of a mobile device 1200 according to another embodiment of the invention. FIG. 12 is similar to FIG. 3. In the embodiment of FIG. 12, the second feeding element 360 and the second matching circuit 192 of the mobile device 1200 are both removed. In other words, the mobile device 1200 includes a first antenna structure which is formed by the first feeding element 350 and the first portion 130 of the metal frame 120. The second portion 140 of the metal frame 120 is excited by the first antenna structure using a coupling mechanism. In addition, the tuning element 170 is moved and positioned between the first shorting point GP1 and the first feeding element 350, but it is not limited thereto. Specifically, the tuning element 170 is electrically coupled to the third connection point CP3 on the first portion 130 of the metal frame 120. The third connection point CP3 may be positioned between the first shorting point GP1 and the second end 132 of the first portion 130. According to the practical measurement, the first antenna structure and the second portion 140 of the mobile device 1200 can cover the median-frequency band from 1710 MHz to 2200 MHz, the first high-frequency band from 2300 MHz to 2690 MHz, and the second high-frequency band from 3400 MHz to 3800 MHz. In response to the different feeding mechanisms, the element sizes of the mobile device 1200 may be adjusted as follows. The length of the first portion 130 (i.e., the length from the first end 131 to the second end 132) may be substantially equal to 0.25 wavelength (λ/4) of the median-frequency band. The distance from the third connection point CP3 to the second end 132 of the first portion 130 may be substantially equal to 0.25 wavelength (λ/4) of the first high-frequency band. The length of the second portion 140 (i.e., the length from the second end 142 to the first end 141) may be substantially equal to 0.25 wavelength (λ/4) of the second high-frequency band. Other features of the mobile device 1200 of FIG. 12 are similar to those of the mobile device 300 of FIG. 3. Accordingly, the two embodiments can achieve similar levels of performance.

Figure 13:
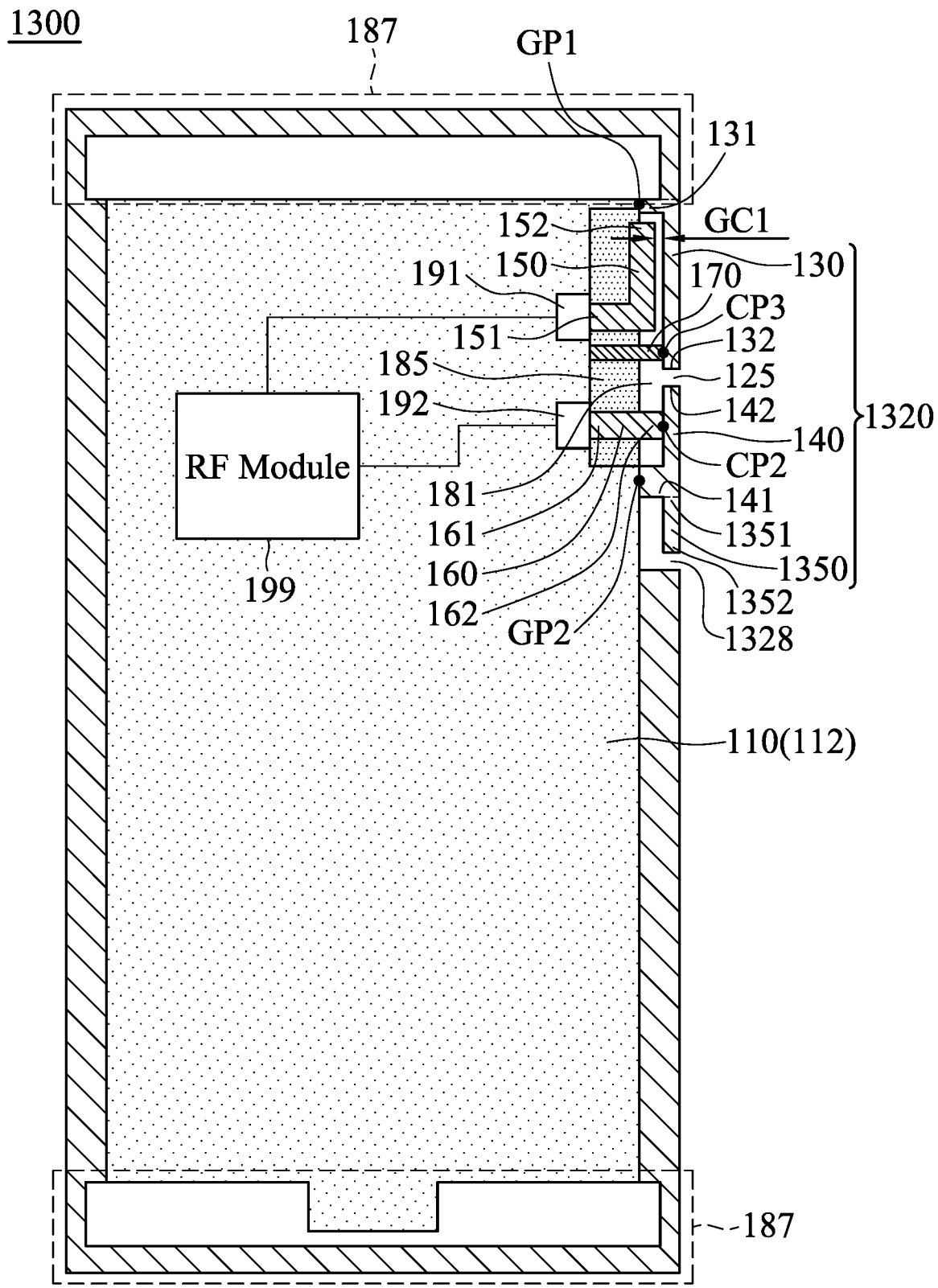
FIG. 13 is a back view of another mobile device according to an embodiment of the invention.

FIG. 13 is a back view of a mobile device 1300 according to another embodiment of the invention. FIG. 13 is similar to FIG. 1A. In the embodiment of FIG. 13, a metal frame 1320 of the mobile device 1300 further includes a third portion 1350 and further has a second cut point 1328. The second cut point 1328 is arranged for completely separating the third portion 1350 from the other portions of the metal frame 1320. Another long and narrow clearance region is formed between the third portion 1350 and the aforementioned side of the display device 185. The first feeding element 150 has a vertical projection which at least partially overlaps the display device 185. The second feeding element 160 also has a vertical projection which at least partially overlaps the display device 185. That is, the first cut point 125 and the second cut point 1328 may be arranged to be close to the middle region of the display device 185. The third portion 1350 may substantially have a straight-line shape or an L-shape. Specifically, the third portion 1350 has a first end 1351 and a second end 1352. The first end 1351 of the third portion 1350 is directly electrically connected to the first end 141 of the second portion 140. The second end 1352 of the third portion 1350 is another open end, which is adjacent to the second cut point 1328. The third portion 1350 of the metal frame 1320 is excited by the second feeding element 160. Accordingly, the operation bandwidth of the second antenna structure of the mobile device 1300 increases, and the mobile device 1300 operates in a plurality of frequency bands. Specifically, the third portion 1350 can be excited to generate an additional operation frequency band. The length of the third portion 1350 (i.e., the length from the first end 1351 to the second end 1352) may be substantially equal to 0.25 wavelength (λ/4) of the additional operation frequency band. It should be noted that the second shorting point GP2 positioned between the first cut point 125 and the second cut point 1328 is not a necessary design element, and the second shorting point GP2 is omitted in other embodiments. Other features of the mobile device 1300 of FIG. 13 are similar to those of the mobile device 100 of FIG. 1A and FIG. 1B. Accordingly, the two embodiments can achieve similar levels of performance. It should be noted that the aforementioned cut points are merely exemplary. In fact, the number and the positions of cut points are adjustable according to different design requirements. Furthermore, the metal frame 120 of FIG. 12 may also have a second cut point for increasing the operation frequency bands.

Note that the above element sizes, element shapes, and frequency ranges are not limitations of the invention. An antenna designer can fine-tune these settings or values according to different requirements. It should be understood that the mobile device and the manufacturing method of the invention are not limited to the configurations of FIGS. 1-13. The invention may include any one or more features of any one or more embodiments of FIGS. 1-13. In other words, not all of the features displayed in the figures should be implemented in the mobile device and the manufacturing method of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A mobile device, comprising:
    a system circuit board, comprising a system ground plane;
    a metal frame, at least comprising a first portion and a second portion, wherein the metal frame at least has a first cut point positioned between the first portion and the second portion;
    one or more other antenna elements, wherein the metal frame further has a second cut point for separating the other antenna elements from the first portion;
    a display device, wherein the first cut point is arranged to be close to a middle region of the display device;
    a first feeding element, directly or indirectly electrically connected to the first portion, wherein a first antenna structure is formed by the first feeding element and the first portion; and
    an RF (Radio Frequency) module, electrically coupled to the first feeding element, so as to excite the first antenna structure;
    wherein the first portion and the second portion of the metal frame are disposed at a same side of the mobile device;
    wherein the first portion has a first end and a second end, the first end of the first portion is a first shorting point which is electrically coupled to the system ground plane, and the second end of the first portion is adjacent to the first cut point.

2. The mobile device as claimed in claim 1, further comprising:
    a second feeding element, directly or indirectly electrically connected to the second portion, wherein a second antenna structure is formed by the second feeding element and the second portion, and the RF module is further electrically coupled to the second feeding element, so as to excite the second antenna structure.

3. The mobile device as claimed in claim 1, wherein the other antenna elements are formed by other portions of the metal frame.

4. The mobile device as claimed in claim 1, wherein the first feeding element is separate from the first portion, and a coupling gap is formed between the first feeding element and the first portion.

5. The mobile device as claimed in claim 1, wherein the first feeding element is directly electrically connected to a first connection point on the first portion, and the first connection point is positioned between the first end and the second end of the first portion.

6. The mobile device as claimed in claim 1, wherein the first antenna structure further comprises a tuning element which comprises:

a plurality of matching elements; and
a switch element, electrically coupled to a position between the first end and the second end of the first portion, wherein the switch element is configured to select one of the matching elements, such that the first portion is electrically coupled through the selected matching element to the system ground plane.

7. The mobile device as claimed in claim 1, wherein the second portion has a first end and a second end, the first end of the second portion is a second shorting point which is electrically coupled to the system ground plane, and the second end of the second portion is adjacent to the first cut point.

8. The mobile device as claimed in claim 2, wherein the second feeding element is directly electrically connected to a second connection point on the second portion, and the second connection point is positioned between the first end and the second end of the second portion.

9. The mobile device as claimed in claim 2, wherein the second feeding element is directly electrically connected to the second end of the second portion.

10. The mobile device as claimed in claim 3, wherein the second cut point is used for separating the other antenna elements from the first antenna structure.

11. The mobile device as claimed in claim 1, wherein the metal frame further comprises a third portion and a third cut point, and the third cut point is used for separating the third portion from other portions of the metal frame.

12. The mobile device as claimed in claim 11, wherein the third portion has a first end and a second end, the first end of the third portion is electrically coupled to the first end of the second portion, and the second end of the third portion is adjacent to the third cut point.

13. The mobile device as claimed in claim 2, wherein the metal frame further comprises a third portion, and the third portion is excited by the second feeding element using a coupling mechanism, so as to increase operation bandwidth of the second antenna structure.

14. The mobile device as claimed in claim 13, wherein the third portion of the metal frame is excited to generate an additional operation frequency band.

15. The mobile device as claimed in claim 1, wherein the metal frame further has a fourth cut point positioned at the other antenna elements.

16. The mobile device as claimed in claim 1, wherein other portions of the metal frame have a fifth cut point and a sixth cut point, and a USB (Universal Serial Bus) hole is positioned between the fifth cut point and the sixth cut point.

17. The mobile device as claimed in claim 1, further comprising:
a back cover, comprising a metal portion and a non-metal portion, wherein the metal portion substantially has a rectangular shape, and the non-metal portion substantially has a loop shape, such that the metal portion is surrounded by the non-metal portion.

18. The mobile device as claimed in claim 1, further comprising:
a back cover, comprising a metal portion, a first non-metal portion, and a second non-metal portion, wherein the metal portion is positioned between the first non-metal portion and the second non-metal portion, and the metal portion is used for separating the first non-metal portion from the second non-metal portion.

19. A mobile device, comprising:
a system circuit board, comprising a system ground plane;
a metal frame, at least comprising a first portion and a second portion, wherein the metal frame at least has a first cut point positioned between the first portion and the second portion;
one or more other antenna elements, formed by other portions of the metal frame, wherein the metal frame further has a second cut point for separating the other antenna elements from the first portion;
wherein the other portions of the metal frame have a third cut point and a fourth cut point, and a USB (Universal Serial Bus) hole is positioned between the third cut point and the fourth cut point;
wherein the first portion and the second portion of the metal frame are disposed at a same side of the mobile device;
wherein the other portions of the metal frame are selectively distributed over a top, a bottom, and/or another side of the mobile device, such that the metal frame substantially has a loop shape.

20. The mobile device as claimed in claim 19, further comprising:
a display device, wherein the first cut point is arranged to be close to a middle region of the display device.

21. The mobile device as claimed in claim 20, further comprising:
a first feeding element, directly or indirectly electrically connected to the first portion, wherein a first antenna structure is formed by the first feeding element and the first portion; and
an RF (Radio Frequency) module, electrically coupled to the first feeding element, so as to excite the first antenna structure;
wherein the first portion has a first end and a second end, the first end of the first portion is a first shorting point which is electrically coupled to the system ground plane, and the second end of the first portion is adjacent to the first cut point.

22. The mobile device as claimed in claim 21, further comprising:
a second feeding element, directly or indirectly electrically connected to the second portion, wherein a second antenna structure is formed by the second feeding element and the second portion, and the RF module is further electrically coupled to the second feeding element, so as to excite the second antenna structure.

23. The mobile device as claimed in claim 21, wherein the first feeding element is directly electrically connected to a first connection point on the first portion, and the first connection point is positioned between the first end and the second end of the first portion.

24. The mobile device as claimed in claim 21, wherein the second portion has a first end and a second end, the first end of the second portion is a second shorting point which is electrically coupled to the system ground plane, and the second end of the second portion is adjacent to the first cut point.

25. The mobile device as claimed in claim 22, wherein the second feeding element is directly electrically connected to a second connection point on the second portion, and the second connection point is positioned between the first end and the second end of the second portion.

26. The mobile device as claimed in claim 22, wherein the second cut point is used for separating the other antenna elements from the first antenna structure and the second antenna structure.

27. The mobile device as claimed in claim 20, wherein the metal frame further comprises a third portion and a fifth cut point, the fifth cut point is used for separating the third portion from the other portions of the metal frame, and the fifth cut point is arranged to be close to the middle region of the display device.

28. The mobile device as claimed in claim 27, further comprising:
a long and narrow clearance region, formed between the third portion and the display device, wherein a vertical projection of the first feeding element at least partially overlaps the display device, and a vertical projection of the second feeding element at least partially overlaps the display device.

29. The mobile device as claimed in claim 27, wherein the third portion has a first end and a second end, the first end of the third portion is electrically coupled to the first end of the second portion, and the second end of the third portion is adjacent to the fifth cut point.

30. The mobile device as claimed in claim 20, wherein the metal frame at a top of the mobile device further has a sixth cut point.

31. A mobile device, comprising:
a system circuit board, comprising a system ground plane;
a metal frame, at least comprising a first portion and a second portion, wherein the metal frame at least has a first cut point positioned between the first portion and the second portion;
one or more other antenna elements, formed by other portions of the metal frame, wherein the metal frame further has a second cut point for separating the other antenna elements from the first portion;
wherein the first portion and the second portion of the metal frame are disposed at a same side of the mobile device;
wherein the metal frame has a top, a bottom, and another side, such that the metal frame has a loop shape, the metal frame further has a second cut point, a third cut point, and a fourth cut point, the second cut point is positioned between the first portion and the other portions of the metal frame, and the third cut point and the fourth cut point are positioned at the other antenna elements;
wherein the first portion has a first end and a second end, the first end of the first portion is a first shorting point which is electrically coupled to the system ground plane, and the second end of the first portion is adjacent to the first cut point.

32. The mobile device as claimed in claim 31, further comprising:
a display device, wherein the first cut point is arranged to be close to a middle region of the display device.

33. The mobile device as claimed in claim 31, further comprising:
a first feeding element, directly or indirectly electrically connected to the first portion, wherein a first antenna structure is formed by the first feeding element and the first portion; and
an RF (Radio Frequency) module, electrically coupled to the first feeding element, so as to excite the first antenna structure.

34. The mobile device as claimed in claim 33, further comprising:
a second feeding element, directly or indirectly electrically connected to the second portion, wherein a second antenna structure is formed by the second feeding element and the second portion, and the RF module is further electrically coupled to the second feeding element, so as to excite the second antenna structure.

35. The mobile device as claimed in claim 31, wherein the first cut point and the second cut point of the metal frame are disposed at the same side of the mobile device.

36. The mobile device as claimed in claim 31, wherein the third cut point and the fourth cut point of the metal frame are disposed at the same side of the mobile device.

37. The mobile device as claimed in claim 33, wherein the first antenna structure further comprises a tuning element which comprises:
a plurality of matching elements; and
a switch element, electrically coupled to a position between the first end and the second end of the first portion, wherein the switch element is configured to select one of the matching elements, such that the first portion is electrically coupled through the selected matching element to the system ground plane.

38. The mobile device as claimed in claim 33, wherein the second cut point is used for separating the other antenna elements from the first antenna structure.

39. The mobile device as claimed in claim 32, wherein the metal frame further comprises a third portion and a fifth cut point, the fifth cut point is used for separating the third portion from the other portions of the metal frame, and the fifth cut point is arranged to be close to the middle region of the display device.

40. The mobile device as claimed in claim 39, wherein the first cut point, the second cut point, and the fifth cut point of the metal frame are disposed at the same side of the mobile device.

41. The mobile device as claimed in claim 31, wherein the third cut point is positioned at the top or another side of the mobile device.

42. The mobile device as claimed in claim 31, wherein the fourth cut point is positioned at the top or another side of the mobile device.

43. The mobile device as claimed in claim 31, wherein the metal frame at the bottom of the mobile device further has a sixth cut point and a seventh cut point.

44. The mobile device as claimed in claim 31, wherein the metal frame at two sides of the mobile device further has a sixth cut point and a seventh cut point.

* * * * *